United States Patent [19]

Overbay

[11] Patent Number: 5,055,654
[45] Date of Patent: Oct. 8, 1991

[54] MAST ASSEMBLY FOR ROTARY TOOL

[75] Inventor: Mark A. Overbay, East Ridge, Tenn.

[73] Assignee: Combustion Engineering, Inc., Windsor, Conn.

[21] Appl. No.: 55,280

[22] Filed: May 29, 1987

Related U.S. Application Data

[63] Continuation-in-part of Ser. No. 28,997, Mar. 23, 1987.

[51] Int. Cl.⁵ .............................................. B23K 9/00
[52] U.S. Cl. ................................... 219/136; 219/60.2
[58] Field of Search .............. 219/136, 74, 75, 125.11, 219/60 A, 60 R, 60.2

[56] References Cited

U.S. PATENT DOCUMENTS

| | | |
|---|---|---|
| 3,084,243 | 4/1963 | Gotch . |
| 3,123,421 | 3/1964 | Phillips .................. 439/17 |
| 3,288,980 | 11/1966 | Rohrberg ............... 219/75 X |
| 3,350,537 | 10/1967 | Lawrence ............... 219/60.2 |
| 3,395,263 | 7/1968 | Kazlauskas ............ 219/125.11 |
| 3,701,072 | 10/1972 | Bjorn et al. ............ 439/5 |
| 3,740,520 | 6/1973 | Daughenbaug ......... 219/60 A |
| 3,780,257 | 12/1973 | Stevens . |
| 3,986,245 | 10/1976 | Savor et al. ............ 219/75 X |
| 4,047,656 | 9/1977 | McCombs . |
| 4,510,372 | 4/1985 | Kobuck . |
| 4,575,612 | 3/1986 | Prunier .................. 219/137.43 |
| 4,580,028 | 4/1986 | Kobuck . |

FOREIGN PATENT DOCUMENTS

| | | |
|---|---|---|
| 715679 | 8/1965 | Canada ................... 219/60.2 |
| 2230288 | 6/1972 | Fed. Rep. of Germany . |
| 574800 | 9/1977 | U.S.S.R. .................. 439/17 |
| 1054294 | 1/1967 | United Kingdom . |
| 1229609 | 4/1971 | United Kingdom . |
| 1482741 | 8/1977 | United Kingdom . |

OTHER PUBLICATIONS

Metals Handbook, 8th Edition, vol. 6, *Welding and Brazing*, pp. 116–117, American Society for Metals, 1974.

Primary Examiner—Leo P. Picard
Assistant Examiner—L. Donovan
Attorney, Agent, or Firm—John H. Mulholland

[57] ABSTRACT

A tool having a rotating mast assembly 12 is provided which includes a hollow conductive gas transmitting electrode 14 and a non-hygroscopic ceramic shielding tube 12 which is made of at least 94% by weight $Al_2O_3$ and has a tensile strength of at least 20,000 P.S.I. and an ability to withstand temperatures in excess of 1500° C.

9 Claims, 1 Drawing Sheet

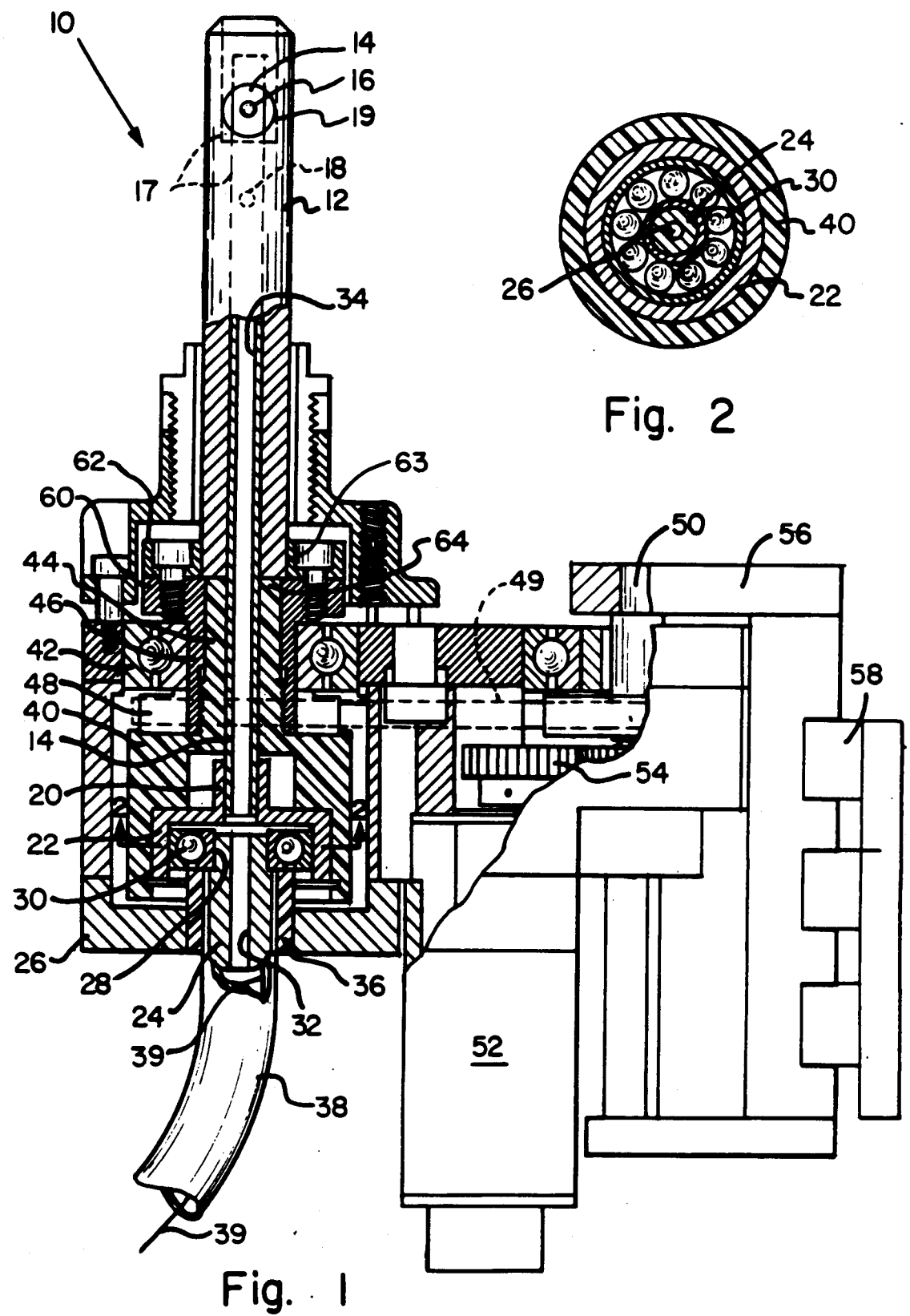

MAST ASSEMBLY FOR ROTARY TOOL

BACKGROUND OF THE INVENTION

This invention is a continuation-in-part of U.S. patent application No. 028,997, filed Mar. 23, 1987 and assigned to the same assignee as the instant application.

FIELD OF THE INVENTION

Rotary mast assemblies are important in tools where an electrode is rotated to perform work within a hole, tube or tube type of plug. The present invention is an improved rotary mast assembly for use in air-cooled tools or machines of the type which may employ rotating electrodes to perform operations such as welding or tube plug shrinking according to the method of U.S. Pat. No. 3,986,245, assigned to the same assignee as the present application.

A specific purpose of the new rotary mast assembly is to provide an improved tool for providing a shielded electric arc which melts the interior surface of a mechanical tube plug thereby causing high residual compressive hoop stress which cause the outside diameter of the tube plug to decrease and allow the plug to be easily withdrawn from a tube sheet within a nuclear steam generator.

When the mast assembly is utilized in a mechanical tube plug shrinker or rotary welder, benefits of compactness of the device, immunity of arcing to undesired ground paths and inherent stability and precise arc placement are provided. Moreover, the material and component parts of the mast assembly are readily available from commercial sources or easily manufactured from available stock and material.

SUMMARY OF THE INVENTION

The invention is a tool having a rotating elongated hollow electrode member mounted on a conductive cup and a coaxial and concentric non-hygroscopic ceramic tube which is at least 94% by weight $Al_2O_3$, has a tensile strength of at least 20,000 P.S.I. and has a resistance to impact of at least 6.5 inch-lbs. when measured by the Charpy D256 test. A hollow electrically conductive power source member is fixed within a housing with a journal portion extending in spaced relation with the cup. A zone of overlap of the cup and the journal on the fixed power source member creates a gap or annular space between the cup interior and the journal. An electrically conductive ball bearing or roller bearing assembly is located in the gap and acts as a rotary electrical connector. The non-hygroscopic ceramic tube has a flange secured to its end within the housing to secure it for rotation with the electrode and cup about a common axis. A belt drives the cup and electrode from a pulley concentrically fixed to the exterior of the insulating member. The end of the electrode is shielded by means of the hollow ceramic tube secured to the rotating structure. The fixed hollow power source member and the rotating hollow electrode are in fluid communication to permit the flow of welding gas to a space between the electrode and non-hygroscopic ceramic tube from a gas source connected to the end of the power source member. The hollow electrode has a radial opening to permit the gas to reach the space. The ceramic tube has a radial opening through which a piece of welding tungsten (sold as EWTH-2) is secured to the electrode and extends from the space through the tube opening such that gas from the space flows along the welding tungsten. An arc of approximately 2000° F. (1093° C.) is generated.

BRIEF DESCRIPTION OF THE DRAWINGS

FIG. 1 is a side elevational view, broken away for clarity, of a tool incorporating a rotary mast assembly according to the principals of the invention.

FIG. 2 is a cross-sectional view taken along the line 2—2, through the zone of overlap, of the rotary electrical connection in FIG. 1.

DETAILED DESCRIPTION OF THE PREFERRED EMBODIMENT

The numeral 10 generally designates a tool having a rotary mast assembly, at least a portion of which is a rotating electrically conductive electrode member, which incorporates a non-hygroscopic ceramic tube for shielding the electrode according to the principles of the invention. As shown, the tool 10 is a mechanical tube plug shrinker which is used to establish a gas-tungsten-arc (GTA) between the electrode and the inner surface of the wall of a steam generator tube plug, such as might be used in a nuclear steam supply system. The method of use of the tool is fully described in U.S. Pat. No. 3,986,245. Typically, it is used to originate a GTA near the upper end of a plug and to simultaneously linearly translate downwardly, and rotate within the plug, an arc which produces a spiraling, overlapping weld bead on the plug inner surface.

The tool 10 includes a rotating hollow non-hygroscopic ceramic tube 12 with an elongated electrode 14 mounted therein for rotation therewith. The hollow electrode 14 is typically of copper and is provided with a hole 16 in which a piece of tungsten is mounted for producing an arc, in a manner well known to those skilled in the art. An opening 18 in the electrode 14 permits argon gas used in the process to flow from the interior of the electrode 14 outwardly to a space 17, along its outer surface adjacent the inner surface of the hollow ceramic tube 12, into the arc producing area which is surrounded by an opening 19 in the ceramic tube 12. The electrode 14 is mounted, as by crimping, in a split collar or collet 20 which is an integral part of an annular conductive cup 22. The conductive cup 22 is, typically, made of hard brass and rotates with the non-hygroscopic ceramic tube 12 and its electrode 14. A fixed electrically conductive hollow member 24, variously called: "the fixed power conducting member", "fixed power fitting", "hollow fixed power fitting", and "power fitting" but always meaning the element 24 in the drawings, is secured to a housing structure 26 of the tool in concentric relationship with the rotating conductive members 14 and 22, about their axis of rotation. A zone of overlap of the rotating cup member 22 and the fixed power conducting member 24, within an annular cavity of the cup 22, forms an annular gap defined by the radial spacing of the rotating annular cup 22 and the fixed power supply fitting 24, the upward end of which has a journal portion 28.

Between the inside annular wall of the cup 22 and the journal portion 28 of the fixed power fitting 24, the annular gap contains a conductive anti-friction means in the form of ball bearings 30. The bearings are, typically, made up of an inner race and an outer race with a plurality of balls therebetween which orbit the axis of the annular journal 28 received therein. The ball bearings 30 are lubricated with a conductive material and are commercially available stainless steel or other suitable conductive material.

The hollow fixed power fitting 24 has a central passageway 32 in fluid communication with the central passageway 34 of electrode 14. An electrically insulating clamp 36, made from a plastic material such as DELRIN, secures a gas supply tube 38 to the power fitting 24, while insulating it from the housing 26. A conductor 39 within the tube 38 supplies current to the power fitting 24 from a suitable power source, as will be readily understood by those skilled in the art.

An outer annular cup structure 40, also of plastic electrical insulating material such as DELRIN, insulates the annular cup 22 and the electrode 14 at its lower end where it is secured by means of the collet portion 20. The insulating member 40 prevents undesired arcing between the annular cup 22, the electrode 14 and the housing 26. Bearings 42 engage an annular extension 44 of the cup 40 to provide increased rotational stability to the rotating non-hygroscopic ceramic tube 12 and electrode 14 during their rotation. Extension 44 has, on its exterior, a surrounding metal member 46 which acts both as the journal within bearings 42 and the support for a drive pulley flange portion 48 which drives the rotational parts. The rotational drive is accomplished by means of a belt 49, shown in phantom in the drawing as connected to a driving shaft and pulley arrangement 50. The shaft 50 is driven by a motor 52 through a gear connection 54.

The entire tool 10, including motor 52, is supported by means of a conventional mounting structure 56. A connection by means of a dovetail bracket 58 holds the tools in position for use, for example, on the underside of a tube sheet of a steam generator of a nuclear steam supply system.

The ceramic mast 12 has a flange 62 by which it is mounted, and secured to a flange 60 on the upper end of the metal member 46 of the rotating structure. The flange 62 is preferably of stainless steel and is joined by means of commercially available and conventional epoxy glue 63 to the ceramic tube 12. It may also be made of an integral portion of non-hygroscopic ceramic tube 12, if desired. A suitable O-ring seal 64 about the electrode 14 at the flanged end of the ceramic tube 12 prevents the back leakage of gas along the electrode 14 outer surface 14 within the bore of ceramic tube 12.

The non-hygroscopic ceramic material from which the tube 12 is constructed is available from General Electric Ceramics, Inc., P.O. Box 89, Laurens, S.C. 29360. It is sold under the trademark ALSIMAG. There are three types of ALSIMAG materials, with tensile strength of at least 20,000 pounds per square inch (P.S.I.), an $Al_2O_3$ content in percent (%) by weight of at least 94%, a resistance to impact of at least 6.5 inch-lbs. when measured by the Charpy D256 test, and which indicate water imperviousness or water absorption of zero percent by weight (0%) when subjected to A.S.T.M. test number C373 for water absorption. All are able to withstand temperatures in excess of 1500° C. (2732° F.). The materials are designated ALSIMAG 771, 614 and 753, respectively. ALSIMAG 614 is believed to be the most suitable material for non-hygroscopic ceramic tube 12. Early trials with boron nitride as the ceramic were not successful because of the hygroscopic nature of that material.

The novel mast assembly for rotary tools made according to the principal of the invention, and described herein in connection with a mechanical tube plug shrinker, will find use wherever tools have elongated members, at least a part of which is a rotating electrically conductive member within a protective sheath are needed. Accordingly, using the mast assembly invention, a reliable and compact tool for plug removal, welded tube sheet plug installation, nozzle dam insert welding, tube pulling and tube sleeving can be provided.

What is claimed is:

1. In an air-cooled tool having a rotating elongated mast assembly, at least part of which is a rotating elongated conducting member;
   a non-hygroscopic ceramic tube coaxially and concentrically surrounding said elongated electrically conductive member;
   an opening in said non-hygroscopic ceramic tube;
   means for securing said non-hygroscopic ceramic tube for rotation with said elongated electrically conductive member about their common axis;
   means for conducting gas from a gas supply means to a space between said conductive member and said non-hygroscopic ceramic tube; and
   welding tungsten secured to said elongated electrically conductive member and extending from said space through the opening in said non-hygroscopic ceramic tube such that gas from said space flows along said welding tungsten.

2. The tool of claim 1 in which the non-hygroscopic ceramic tube is substantially impervious to water when subjected to A.S.T.M. test number C373 for water absorption.

3. The tool of claim 1 in which the non-hygroscopic ceramic tube is at least 94% by weight $Al_2O_3$.

4. The tool of claim 1 in which the non-hygroscopic ceramic tube has a tensile strength of at least 20,000 pounds per square inch.

5. The tool of claim 1 in which the non-hygroscopic ceramic tube has a flange thereon to define the means for securing said non-hygroscopic ceramic tube for rotation with said elongated electrically conductive member.

6. The tool of claim 1 in which the elongated electrically conductive member is hollow and defines the means for conducting gas from a gas supply means to a space between said conductive member and said non-hygroscopic ceramic tube.

7. The tool of claim 6 in which the gas flows transversely through an opening from the interior of the hollow conductive member to the space between said member and the non-hygroscopic ceramic tube.

8. The tube of claim 1 in which the non-hygroscopic ceramic tool has a resistance to impact of at least 6.5 inch-lbs. when measured by the Charpy D256 test.

9. The tool of claim 1 in which the non-hygroscopic ceramic tube has an ability to withstand temperatures in excess of 2000° F. (1093° C.).

* * * * *